United States Patent [19]

Northrop

[11] Patent Number: 5,078,882
[45] Date of Patent: Jan. 7, 1992

[54] BIOCONVERSION REACTOR AND SYSTEM

[75] Inventor: Jere Northrop, North Tonawanda, N.Y.

[73] Assignee: Bion Technologies, Inc., Tonawanda, N.Y.

[21] Appl. No.: 496,587

[22] Filed: Mar. 21, 1990

[51] Int. Cl.⁵ .............................. C02F 3/02; C02F 3/32
[52] U.S. Cl. .................................. 210/602; 210/607; 210/610; 210/615; 210/621; 210/622; 210/624; 210/629; 210/747; 71/9; 71/24
[58] Field of Search ............... 210/602, 607, 610, 611, 210/615, 616, 617, 621, 622, 624, 629, 631, 747; 435/262, 264; 71/6, 9, 24

[56] References Cited

U.S. PATENT DOCUMENTS

| | | | |
|---|---|---|---|
| 681,884 | 9/1901 | Monjean | 210/602 |
| 3,138,449 | 6/1964 | Renfro | 71/24 |
| 3,429,806 | 2/1969 | Carter et al. | 210/621 |
| 3,485,750 | 12/1969 | Albertson | 210/622 |
| 3,537,836 | 11/1970 | Renfro | 71/24 |
| 3,770,623 | 11/1973 | Seidel | 210/602 |
| 4,062,770 | 12/1977 | Kneer | 71/9 |
| 4,263,142 | 4/1981 | Burton | 210/747 |
| 4,333,837 | 6/1982 | Plósz et al. | 210/602 |
| 4,678,582 | 7/1987 | Lavigne | 210/602 |
| 5,011,604 | 4/1991 | Wildo et al. | 210/602 |

FOREIGN PATENT DOCUMENTS

| | | |
|---|---|---|
| 644570 | 8/1984 | Switzerland . |
| 916438 | 4/1982 | U.S.S.R. . |
| 916440 | 5/1982 | U.S.S.R. . |

Primary Examiner—Stanley S. Silverman
Assistant Examiner—Christopher Upton
Attorney, Agent, or Firm—William J. Crossetta, Jr.

[57] ABSTRACT

The invention relates to an apparatus and process useful for the biological transformation of waste materials into ecologically desirable materials. A meta system reactor is disclosed comprising three primary zones which are cyclically and dynamically connected by a circulating fluid. In the process of the invention, each of a bioreactor zone, solids ecoreactor zone and georeactor zone further comprise secondary subsystems and are cyclically connected by a series of recycle flows and organism movements to bioconvert the contained materials. The converted materials produced can be desirable and ecologically beneficial end products comprising gases such as nitrogen, oxygen, carbon dioxide, and water vapor; a biologically active and highly beneficial humus material; and clean water which may be passed through a final wetlands polishing and biomonitoring system before discharge into a natural receiving water.

12 Claims, 10 Drawing Sheets

BIOCONVERSION REACTOR AND SYSTEM

The invention relates to an apparatus and process useful for the biological transformation of waste materials into ecologically desirable materials.

BACKGROUND OF THE INVENTION

Unfortunately, the ecosystem of the planet upon which we live suffers from the advances of society. The air, water and even the earth itself become more polluted each day in a manner which tends to significantly decrease the amount of living biomass which remains in our ecosystem. It is generally believed that continued destruction of the planet's biomass reservoir will tend to further destabilize the global ecosystem with eventual consequences serving to significantly decrease the biological capacity of the planet.

Current waste collection and disposal methods cause the destruction of living organisms and environments and act to both destroy part of the living global ecosystem and to prevent its recovery. This problem is further intensified by the production and disposal of toxic materials which are spread through the environment, destabilizing the ecosystem.

Many of the solutions which have been enacted to solve the waste problem are incomplete or so specialized that they only serve to change or postpone the problem. For example, through building of waste water treatment plants, water quality has been significantly improved but a major problem has developed concerning the disposal of the sludge that is produced. Similarly, the building of more effective liners and containment caps for landfills postpones final solutions. Incineration destroys organic material rather than reintroducing it into the living biomass of the ecosystem thus accelerating the transfer of organic carbon into atmospheric carbon dioxide.

The instant invention addresses the aforesaid concerns by providing a means to resolve ecological problems through the bioconversion of waste materials into economically and/or ecologically beneficial materials. Thus, it is an object of the instant invention to provide apparatus and a process to create new wetland areas and a biologically active humus material through the bioconversion of landfills, waste waters, sludges, toxins and other waste materials.

SUMMARY OF THE INVENTION

The invention comprises an apparatus, hereinafter referred to as a meta system reactor (MSR), which is operative with or without the process of the invention, to achieve biological transformation of waste materials into ecologically desirable materials.

The MSR comprises three primary subsystems or zones which are cyclically and dynamically connected by a circulating fluid communication/transport medium. A bioreactor zone contains at least one microbial environment together with a microbial biomass; a solids ecoreactor zone contains a wetlands environment comprising plants, animals and microorganisms adequate to capture solids from the bioreactor zone; and, a georeactor zone comprises a porus mixture of sand, gravel, or other inert material with a complex flora and fauna of living organisms.

In the process of the invention, each of the bioreactor zone, solids ecoreactor zone, and georeactor zone further comprise secondary subsystems which are cyclically connected by a series of recycle flows and organism movements to bioconvert the contained materials. The converted materials produced by the MSR can be desirable and ecologically beneficial end products comprising gases such as nitrogen, oxygen, carbon dioxide, and water vapor; a biologically active and highly beneficial humus material; and clean water which may be passed through a final wetlands polishing and biomonitoring system before discharge into a natural receiving water.

The MSR is operated by controlling recycle flows, organism movements, and growth through an operational environment which promotes the creative enhancement of biological diversity and capability, the rational optimizing of bioconversion functionality, and the maintenance of covariance in terms of all informational, material, and chemical exchanges between or among the various subsystems within the MSR as a whole.

DETAILED DISCLOSURE OF THE INVENTION

The MSR employs a novel process for attaining the bioconversion of waste materials into other economically desirable or ecologically neutral materials. The novel process utilizes living systems such as microbes, plants and animals in bioconversion and specifically exploits their creative capability to adapt, to achieve the bioconversion of waste materials.

The three cyclically connected primary subsystems or zones of the MSR function as a part of an input/output flow through system, typically interfaced with the natural environment by a fourth subsystem or zone which is concerned with the biomonitoring and documentation of ecological integrity.

The MSR functions under the overall guidance of three, complementary, operational control strategies. The first strategy is to enhance creative biodiversity. This encourages the rapid evolution of new patterns of organismal behavior and capability. The second strategy comprises imposing general biological control, based on the maximum entropy principle, to optimize the system. This requires the moderation of dynamic environmental extremes, the maintenance of suitable nutritional balances, and artificially altering physical, chemical, and biological subenvironments. The third strategy comprises controlling the communication/transport fluid so as to optimize the covariance of all information, material and chemical exchanges among various components of the system as a whole.

The MSR can be used for the bioconversion of a wide variety of undesirable materials, particularly waste materials, into ecologically and/or economically desirable or neutral substances. The materials to be bioconverted can be in the form of solids, liquids or gases, and can be continuously and/or sporadically introduced into the MSR. The MSR can be constructed around or adjacent to an existing supply or deposition of the undesirable material such as domestic and industrial waste waters, process or cooling water discharges, natural waters from streams, creeks or drainage ditches, waste solvents, cleaners, groundwater, gaseous streams containing air, oxygen, industrial waste gases or exhausts, incinerator and other combustion emissions, solid materials and substances such as garbage and household refuse, waste water sludges, solidified hazardous wastes, wastepaper, manures, brush, and other organic debris.

The material to be treated can be introduced into one or more of the three primary subsystems of the MSR. Typically such introduction involves controlled inflow, however, in cases involving solid or liquid waste materials the MSR may be constructed around or within the undesirable materials to be treated so that the materials become subject to the bioconversion process through the fluid dynamics of the subsystems of which they are a part.

The MSR derives its effectiveness from the cyclical interrelationships between the three primary bioconversion subsystems.

The bioreactor comprises a structurally contained and physically controlled microbial growth zone. Its principle function is to attach soluble materials to living aggregates of biomass and to begin the bioconversion process through the association of the undesirable material with microbial physiological processes. A bioreactor may contain multiple different subenvironments, including aerobic, anoxic and/or anaerobic zones, mixing, quiescent, settling and solids separation zones, and it may involve one or more recycles. Suitable bioreactors include chemostats, fermentors, activated sludge systems, trickling filters, biotowers, fluidized bed suspended growth systems, rotating biological contactors, and a variety of series or parallel connections with one or more recycles of one or more of the preceding systems.

A type of bioreactor which is typically preferred in an MSR is a combined, suspended growth/fixed film system with solids concentration and recycle capability. Preferably it contains both aerobic and anaerobic zones. No attempt is made to achieve effluent clarity from the bioreactor as excess solids which are generated are transferred to the solids ecoreactor in the process of the invention.

The solids ecoreactor typically takes the form of a constructed wetland system containing a wide variety of microorganisms, plants and animals. The ecoreactor may be contained in a greenhouse like structure but typically is exposed to the weather and open to the natural environment. The principle function of the solids ecoreactor is to collect excess biomass produced by the bioreactor and the georeactor, and to convert these solids into an ecologically beneficial humus material.

Conversion to humus within the ecoreactor occurs through the interaction of the many diversified microorganisms, plants and animals with the solids biomass of the bioreactor and georeactor. The root and stem systems of the various plants assist in capturing the microbial solids and provide extensive surface area for further microbial growth. In turn the entrapped microbial biomass provides a growth medium and substrate for the developing plant and animal biomass. As plants and animals die or are harvested the organic material so produced becomes mixed with the living plant, animal and microbial biomass to produce a balanced humus material.

Humus material generated in the ecoreactor can contain a chemical and biological composition which will make it suitable and valuable for commercial use. It can be mixed with a variety of other inorganic materials such as sand, clay, gravel, etc., to produce a variety of different soils useful in agricultural, landscaping, forestry, and ecological applications.

In addition to treating the solids biomass from the bioreactor, the ecoreactor provides additional treatment of materials which may be contained in an aqueous and/or gaseous phase. As materials contained in an aqueous phase and/or gaseous phase move through the ecoreactor, plants, animals and especially microorganisms assimilate and act upon them, thereby furthering the bioconversion process.

The georeactor is typically located under the solids ecoreactor and is comprised of rocks, gravel, sand, or other inert particularized materials preferably arranged so that fluids can move through them from the ecoreactor without need for artificial pumping means. The georeactor also supports an extensive living fauna and flora including microorganisms, animals, particularly insect larva, plant roots and mycelia.

Materials to be bioconverted typically flow through the georeactor in aqueous or liquid medium, or, can be bubbled through in gaseous form. Solid materials may also be placed into the georeactor. If the materials to be treated are toxic, concentration and location is typically controlled so as to provide subzones where bioconversion can occur without the destruction of other necessary organisms.

Fluid movement within the georeactor can also be controlled and directed by appropriate placement and operation of various collection and distribution pumps, pipes, wells, etc. In general it is preferred to isolate the material to be bioconverted within the georeactor to prevent migration into the surrounding environment, particularly when the georeactor is not isolated from the general ground soil. Typically the georeactor is easily isolated using an artificial or natural, impervious liner.

The bioreactor, solids ecoreactor, and georeactor can be connected in a variety of ways. Typically the bioreactor receives a liquid influent stream consisting of water pumped from the georeactor and/or liquids such as waste water, industrial process discharges, runoff and the like. The liquid effluent of the bioreactor and any excess biological solids generated by the bioconversion activity occurring within the bioreactor is transferred into the solids ecoreactor for further bioconversion.

By constructing the georeactor under the ecoreactor it is intended that aqueous effluent from the solids ecoreactor will seep down into the georeactor. Other ecoreactor effluent may also be pumped, or otherwise allowed to flow into the georeactor. Alternately ecoreactor effluent may be recycled back into the bioreactor, or may be discharged into an additional wetland subsystem for effluent polishing and biomonitoring. Typically effluent from the georeactor will be removed by pumping and will be discharged into the bioreactor.

Air and other gases which are used in the bioreactor are typically exhausted into the atmosphere. If exhaust gases are particularly odorous, hazardous or useful they may be introduced into the georeactor, usually near the bottom, for scrubbing and further removal of undesirable material. Air, oxygen, or other gases may also be introduced into various zones of the ecoreactor to promote bioconversion.

The final aqueous effluent from the MSR will typically pass through an additional wetland system prior to discharge into a receiving water of the surrounding environment. This final wetland system provides effluent polishing and can constitute an appropriate environment for biomonitoring. A wide variety of native and other indicator plants and animals are maintained in this wetland in such a manner so as to provide continuous monitoring of effluent quality and compatibility with the receiving environment.

Operation of the MSR of the invention in accord with the process of the invention, involves the implementation of three complimentary management strategies in the subsystems. The first of these strategies concerns the enhancement of creative diversity in the collective biomass.

It is well known that living systems are creative in their capability to develop innovative procedures fostering bioconversion. Successful exploitation of this capability typically involves optimizing the environments in which the organisms live so as to encourage development of new bioconversion procedures.

I have found that continued evolution of multiple interactive environmental areas occurs as the growth environment changes, each change favoring certain types of biological activity. Though some areas will remain static with respect to their defining environmental constraints others will cyclically or sequentially change in response to changing bioconversion requirements or conditions. Typically a collection of subenvironments will tend to simplify through normal operations.

Implementation of an operational control strategy to enhance creative diversity can be attained by operational modifications of the subsystems through physical changes to the environmental geometry of the systems, the introduction of new materials, including chemical, physical, or biological substances, fluid stream splitting, and changes in recycle rates or configurations. Operational modifications should be implemented in a dynamic and continuing fashion in various parts of the existing systems which provides the greatest possible opportunity for the living biomass to evolve new procedures, processes, and organisms for the continuing bioconversion of the available materials.

The second operational control strategy involves the optimization of the existing functioning bioconversion processes and works in concert or opposition to the first principle of creative enhancement. Theoretically this strategy can be described as a generalized application of the maximum entropy principle that all living systems change to maximize the entropy of the information available to, or contained within, the organism.

This characteristic of all living systems is exploited in the MSR through a biological process control procedure which can be seen as delegating decision making to the actual organisms involved in the bioconversion process. Thus the microorganisms, plants and animals within the MSR are exposed to the material to be bioconverted and the local environment of the organism(s) is continually adjusted to favor organism behavior which will eventually enhance bioconversion of the contained material.

In practice this involves modifications which tend to stabilize individual local organismal environments. Appropriate nutritional balances must be maintained so that monitoring and regulating nitrogen and phosphorus concentrations, ionic strength, trace metal availability and the like is required. Temperature, pH, hydraulic variations and the like must be regulated to avoid sudden or pronounced changes. As a local environment becomes successful in the desired bioconversion it is expanded. Non-utilized and counterproductive areas and procedures are reduced or eliminated with efforts continually directed to favor the functional expression of the desired bioconversion.

Optimization typically tends to simplify the organismal environments through the expansion of successful and more specialized subsystems, while creative enhancement acts to diversify the environments through the continual creation of new and different subsystems and organisms. I have found that despite the apparent conflict, both types of activities and strategies are necessary for attaining a successfully evolving MSR. If either form becomes dominant typically efficiency or adaptability will suffer.

The simultaneous application of both creative enhancement and optimization strategies results in the construction and operation of many variable subenvironments. These subenvironments dynamically change in size, extent and functionality as the MSR evolves, which in turn requires application of the third strategy, an operational strategy stressing flexibility and diversity.

The bioconversion of even the simplest of materials involves many different stages and processes within the organismal environment, occurring under a dynamically but cyclically changing set of environmental conditions in the MSR. When dealing with typical waste products, any particular material will often be encountered in varying locations and concentrations throughout the product. Even when a particular material is encountered in relatively constant quantities it will appear different to the bioconversion organisms contained in the system because of the varying environmental conditions. Thus, the MSR itself resembles a living organism in terms of its continually changing structure and operation.

The movement of water and gas within each primary subsystem, and their movement from subsystem to subsystem, provides the main vehicle for the transport and exchange of information, materials, and chemicals within the MSR. This function is critical to the successful operation of the system and its operational control is the principal means of insuring successful bioconversion. Thus, all components of the MSR should be at least periodically exposed to some form of cyclical fluid movement and this should occur in a manner which connects all parts of the MSR with each other. If there is more than one type of cyclical fluid system, then provision should be made for these systems to interact with each other as well.

This communication has a major impact on the design, operation, and evolution of each MSR and thus some form of fluid recycle line or process should connect all practical pairs or groupings of subsystemic components. Such recycle connections may be operated such that the quantity of material or fluid which is actually recycled is very small relative to the size and dynamics of the subsystems, but it is critically important that some recycle occurs.

Communication also takes place between the resident organisms within the MSR and is facilitated by the movement of the organisms themselves. Since this will clearly result in the exchange of information, materials, and chemicals within the subenvironments, every effort should be made to encourage and assist the biological availability of the subenvironments to each other.

Details of the invention will be more readily understood by reference to the following description when taken in conjunction with the accompanying drawings.

THE MSR AS A WASTE WATER TREATMENT SYSTEM

Figure 1:
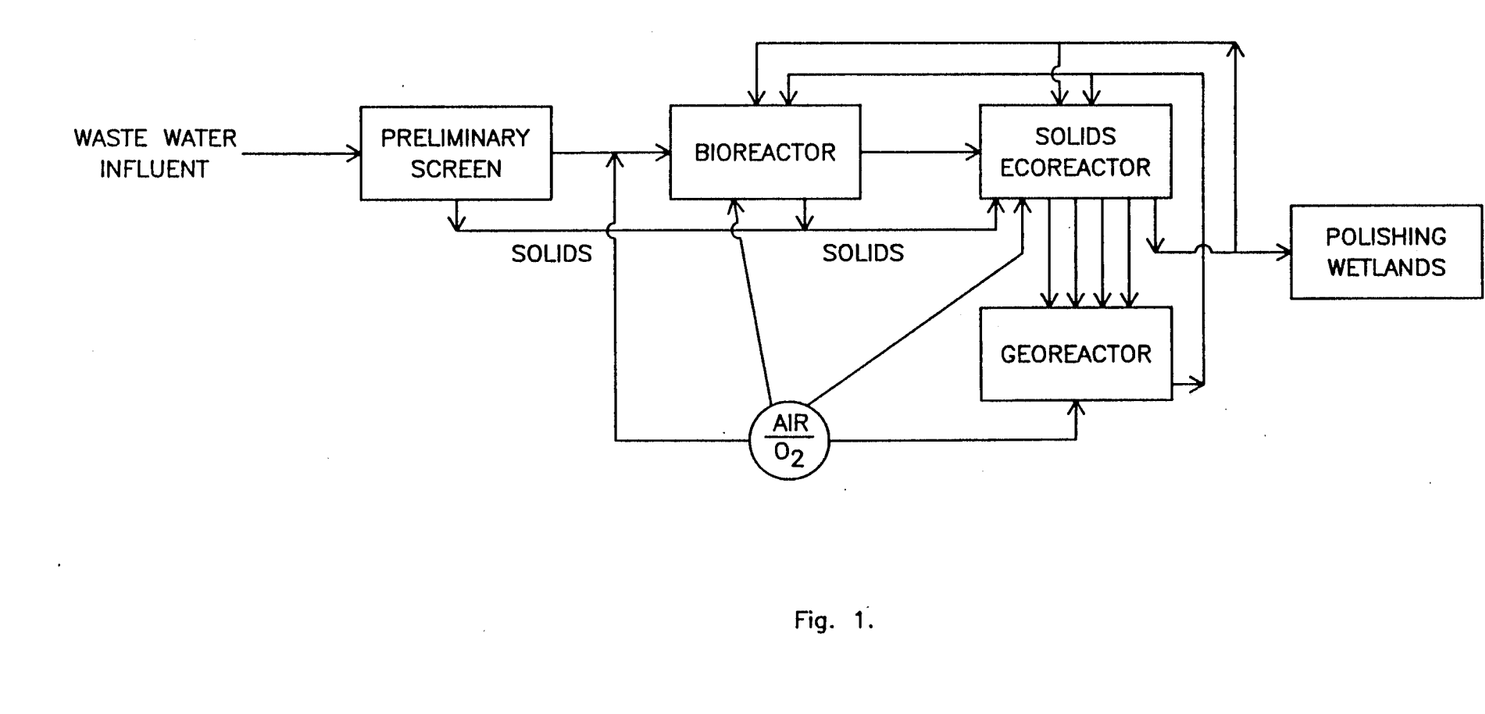
FIG. 1 shows an MSR configured to function as a waste water treatment plant.

FIGS. 1 illustrates an MSR configured to function as a waste water treatment plant. Therein, waste water influent passes through a preliminary screen where grit and other large particulate matter(screenings) are removed for direct cycling to the solids ecoreactor with preliminarily cleaned influent entering the bioreactor.

The effluent from the bioreactor, and any solids which may be wasted separately from the effluent, are cycled into the solids ecoreactor, which is preferably located directly on top of the georeactor. The solids ecoreactor contains maximally diversified populations of plants, animals, and microorganisms, all living in an extensive variety of different subenvironments. Water depth within the solids ecoreactor varies from over 4 meters to less than one centimeter.

Over its entire area water is allowed to seep through the solids ecoreactor into the georeactor typically being assisted by shallow dispersion wells or injection pipes. The georeactor itself ranges from one to 10 meters deep and is typically lined with either an impervious liner such as plastic, clay or the like. It contains a porus inert material such as gravel, crushed rock, sand, etc.

A series of collection pipes are located just above the liner and water from the bottom of the georeactor is recovered and pumped to the surface, where it is diverted either back to the bioreactor or to the beginning of the solids ecoreactor. If the georeactor does not have a liner then collection wells are installed at various locations to collect the water seeping through the georeactor for recycle.

Air may be bubbled up through places in the solids ecoreactor or the georeactor. This allows for zones having different dissolved oxygen levels and hence favors different microbial and other organismal populations.

A portion of the effluent from the solids ecoreactor may be recycled back to the bioreactor or to the beginning of the solids ecoreactor. It may also be introduced into the georeactor at locations separate from the collection pipes or wells. The remainder of the effluent is transferred to a final wetlands area for final polishing and biomonitoring. Alternately, the effluent leaving either the solids ecoreactor or the final polishing wetlands can be disinfected by the installation of a standard design unit. Typically the effluent leaving the final polishing wetlands will be of sufficient quality so that disinfection will not be required.

Figure 2:
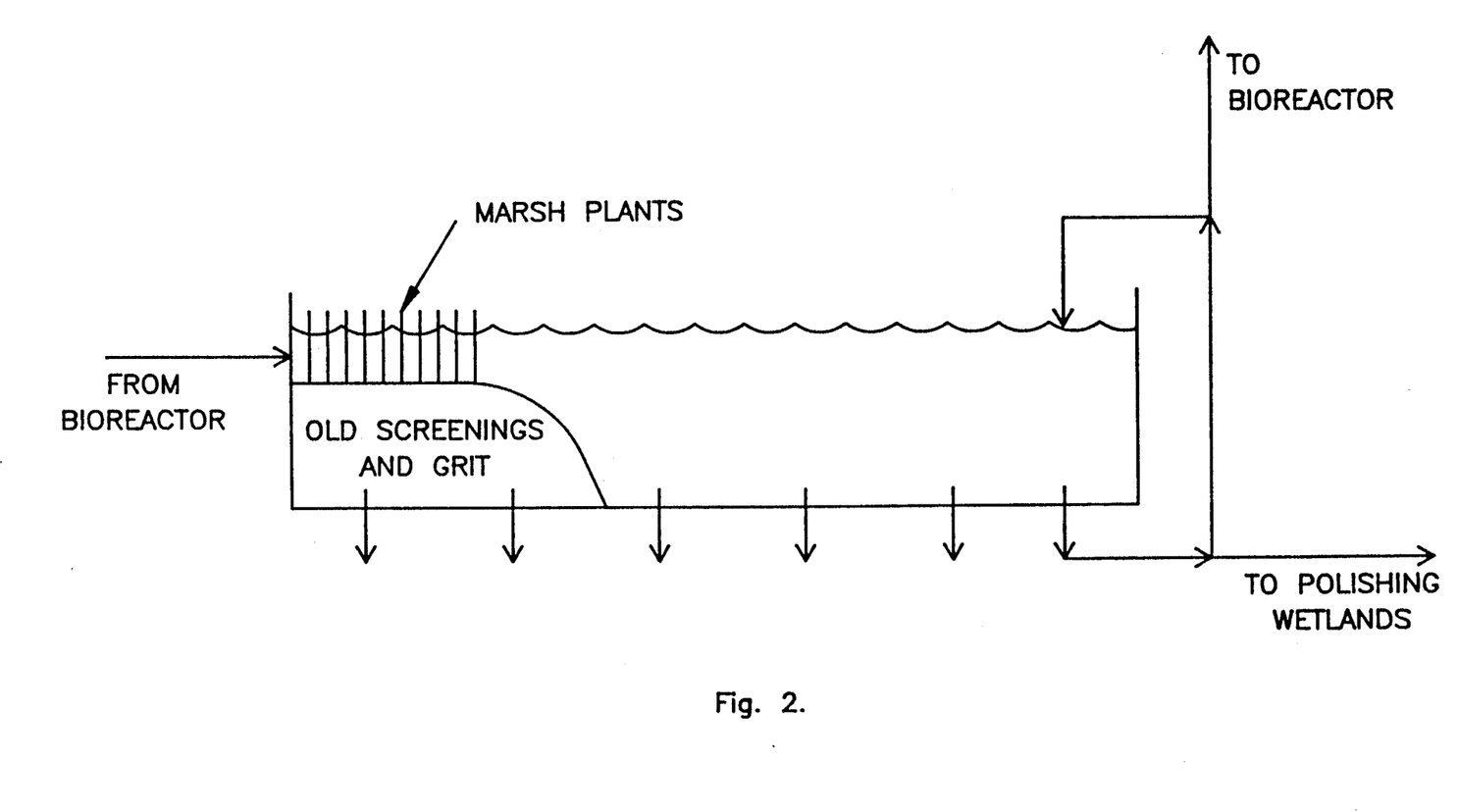
FIG. 2 shows a subsection of a solids ecoreactor for receiving screenings and grit.

A typical subsection of a solids ecoreactor which receives screenings and grit is shown in FIG. 2. This subsection is hydraulically separated from the rest of the solids ecoreactor and should be located above the georeactor. The screenings and grit are deposited in an area where they will generally be under at least ten centimeters of water. In addition to the screenings and grit this subsection typically receives a steady flow of bioreactor effluent and/or solids ecoreactor effluent. The effluent from this subsection is typically returned to the bioreactor for recycle.

Figure 3:
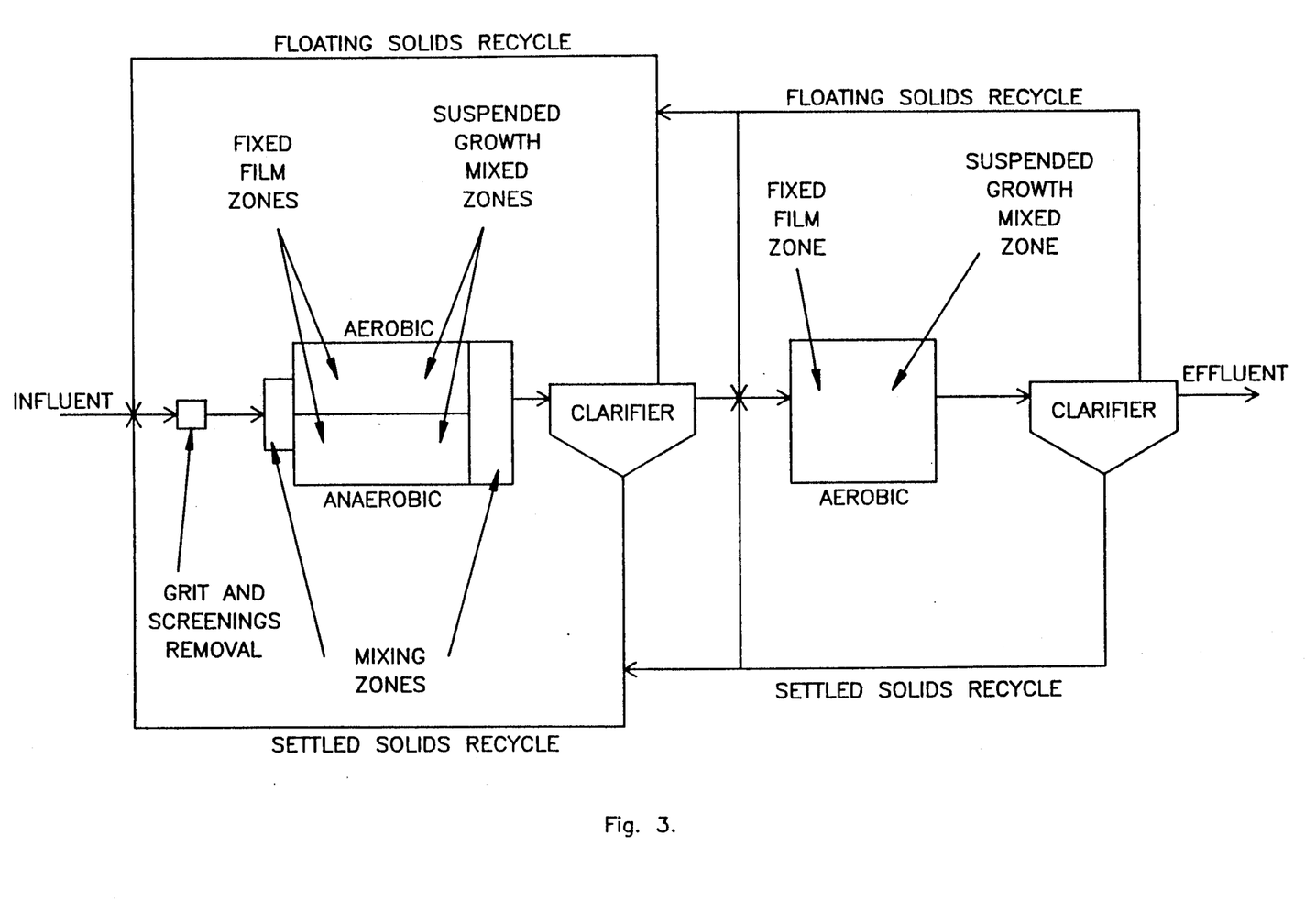
FIG. 3 shows a typical bioreactor for use in an MSR.

Because the MSR as a whole handles all of the functions of conventional waste water treatment the bioreactor subsystem can function in a more specialized role than in a conventional waste water treatment plant. FIG. 3 illustrates a typical bioreactor for use in a constructed MSR. The influent to the bioreactor is split into two parallel streams. One of these is aerated and mixed while the other is mixed in the absence of oxygen.

Each respective stream flows through an number of suspended growth and fixed film zones. The suspended growth zones consist of relatively unobstructed volumes where hydraulic mixing occurs. The fixed film zones contain a matrix of either inert or organic media, plastic surfaces, brush, shredded tires, etc., which provide surface area for microbial growth The two separate streams are then recombined and passed to a solids separator system. Here a part of the biological solids are recovered and returned to the influent to the bioreactor where they are mixed with that influent. The rest of the combined stream, still containing many solids, passes into a second suspended growth aeration zone then to a solids separation area where some solids are separated and recycled back either to the influent of the secondary aeration zone or to the bioreactor influent stream.

The remaining stream constitutes the bioreactor effluent, which may still contain many solids, and which is transferred to the solids ecoreactor. Occasionally some solids may be wasted from one or both of the solids separators, but this wasting is only to prevent inorganic buildup in the bioreactor. This wasting is also delivered to the solids ecoreactor.

Figure 4:
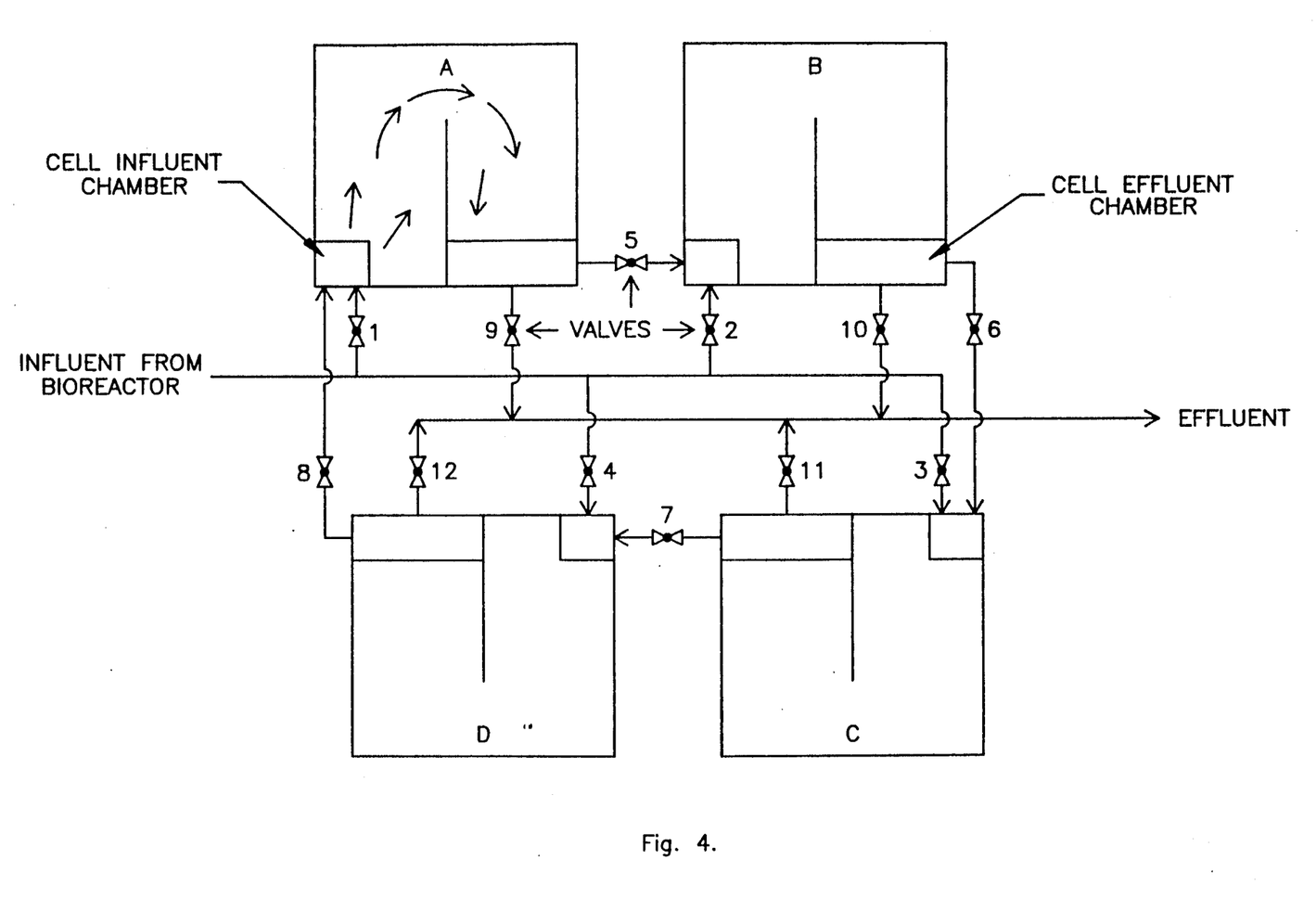
FIG. 4 shows a configuration of a solids ecoreactor.

A basic configuration of the solids ecoreactor is illustrated in FIG. 4. The solids ecoreactor is composed of separate but connected cells which allows a given cell to serve as a primary solids accumulator. When the cell becomes full, a second cell is converted into the primary solids accumulator and so on. The effluent from the primary solids accumulator cell flows through all other cells in the reverse order of that in which they served as primary cells. Thus, the influent to the solids ecoreactor flows first through the primary solids accumulator cell, then through the cell which previously was the primary accumulator cell, then through the cell which had been the primary cell before that, and so forth.

To illustrate the above sequence, referring to FIG. 4, if cell D is serving as the primary accumulator cell then valves 4, 8, 5, 10 and 11 would be open and valves 7, 12, 1, 9, 2, 6, 3, and 7 would be closed. Bioreactor effluent would enter cell D through valve 4, flow on to cell A, cell B and then into the effluent channel for discharge from the solids ecoreactor. In this process cell C would be drying in preparation for the collection of its humus material for further use.

As an individual cell moves through the above sequence, its organismal population also goes through a natural evolution. The sludge which is initially deposited in the first phase is subjected to a series of actions by other organisms. Plant growth becomes more extensive and animal populations emerge which act on the steadily accumulating organic plant material. All of this results in gradual bioconversion of the bioreactor sludge into an organic humus material.

After a suitable period of time, usually from three to six years, a given cell is disconnected from the hydraulic flow pattern of the solids ecoreactor. It is then allowed to dry and the plant and humus material is mixed and collected for its value as a fertilizer, soil enhancer, plant growth medium or the like.

THE MSR AS A WASTEWATER PLANT SLUDGE TREATMENT SYSTEM

This application of an MSR incorporates an existing wastewater treatment plant as a bioreactor. Changes can be made in the operation of an existing wastewater treatment plant which would result in its being able to treat a substantially higher flow and solids loading than may have been previously possible because the old plant would no longer have to produce a clarified effluent, since this function would now be handled by the solids ecoreactor within the MSR. The old plant could, therefore, be overloaded both hydraulically and organically, if it was done in a manner which correspondingly increased the active biomass which was resident in the old system.

Figure 5:
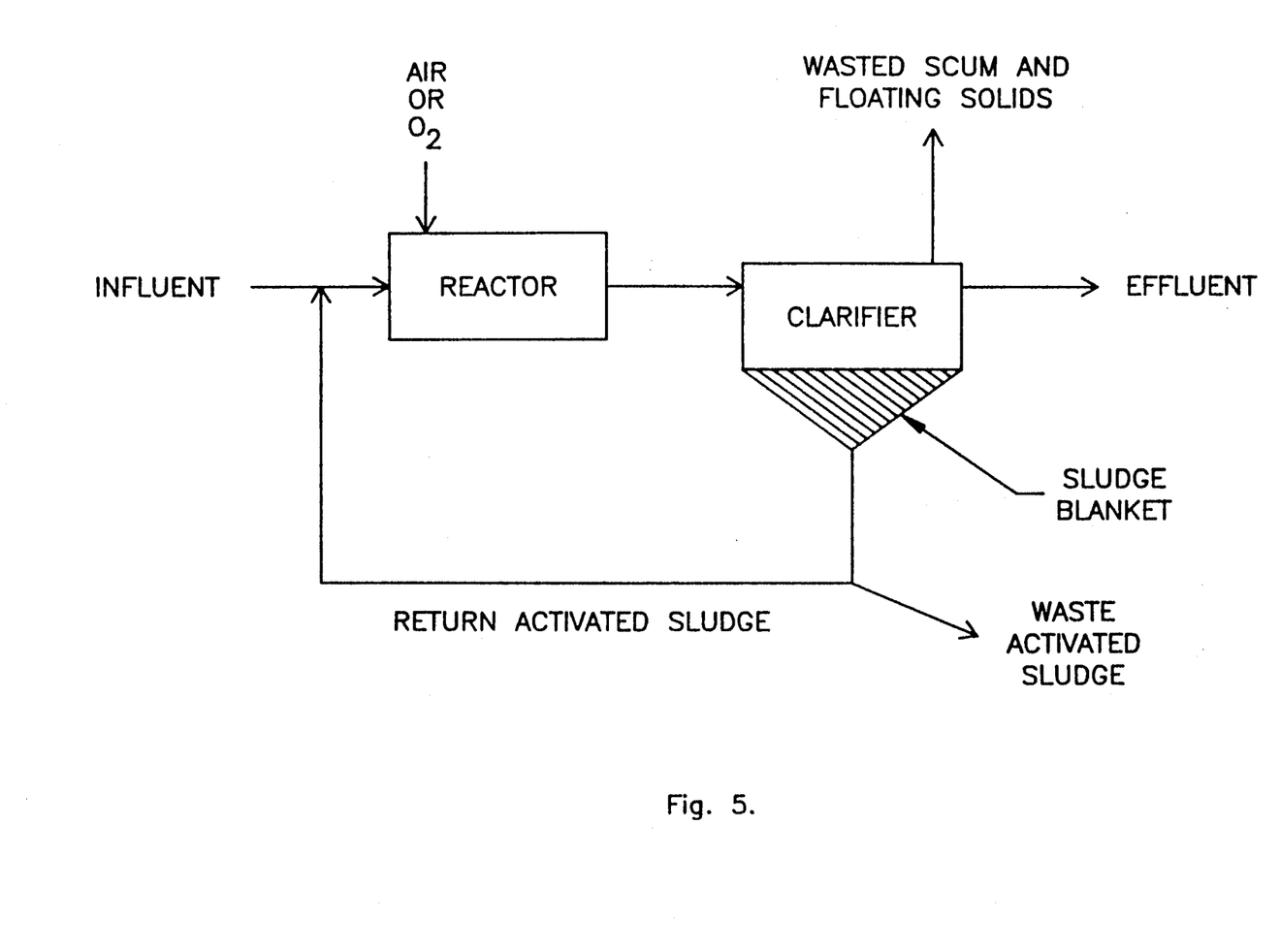
FIG. 5 shows a conventional activated sludge process.

One of the principal ways of doing this would be to alter the procedures by which clarifiers and other solids separation devices are operated. FIG. 5 illustrates a conventional wastewater activated sludge treatment process wherein influent wastewater is mixed with a returned activated sludge (biomass) and mixed with either pure oxygen or air in an aeration reaction chamber. The resulting mixed liquor is then transferred into a clarifier where the activated sludge is allowed to settle and is then drawn off and returned to be mixed with the incoming wastewater. The overflow which is discharged from the clarifier weir is usually free of most solids and has a substantially lower solids and organic content than did the influent wastewater.

In the typical operation of a conventional activated sludge system suspended solids concentration in the aeration chamber would be kept between 600 mg/l to 6,000 mg/l (depending on whether air or oxygen is being used), a dissolved oxygen level of at least 2 mg/l would be maintained in the aeration chamber, the sludge blanket height in the clarifiers would be kept low, usually 25 percent of the total depth, and the solids recycle rate would range from about 10–50 percent of the influent flow. In order to maintain such conditions excess solids are regularly wasted from the return activated sludge recycle and scum or floating material is collected from the surface of the clarifier and removed from the system.

Figure 6:
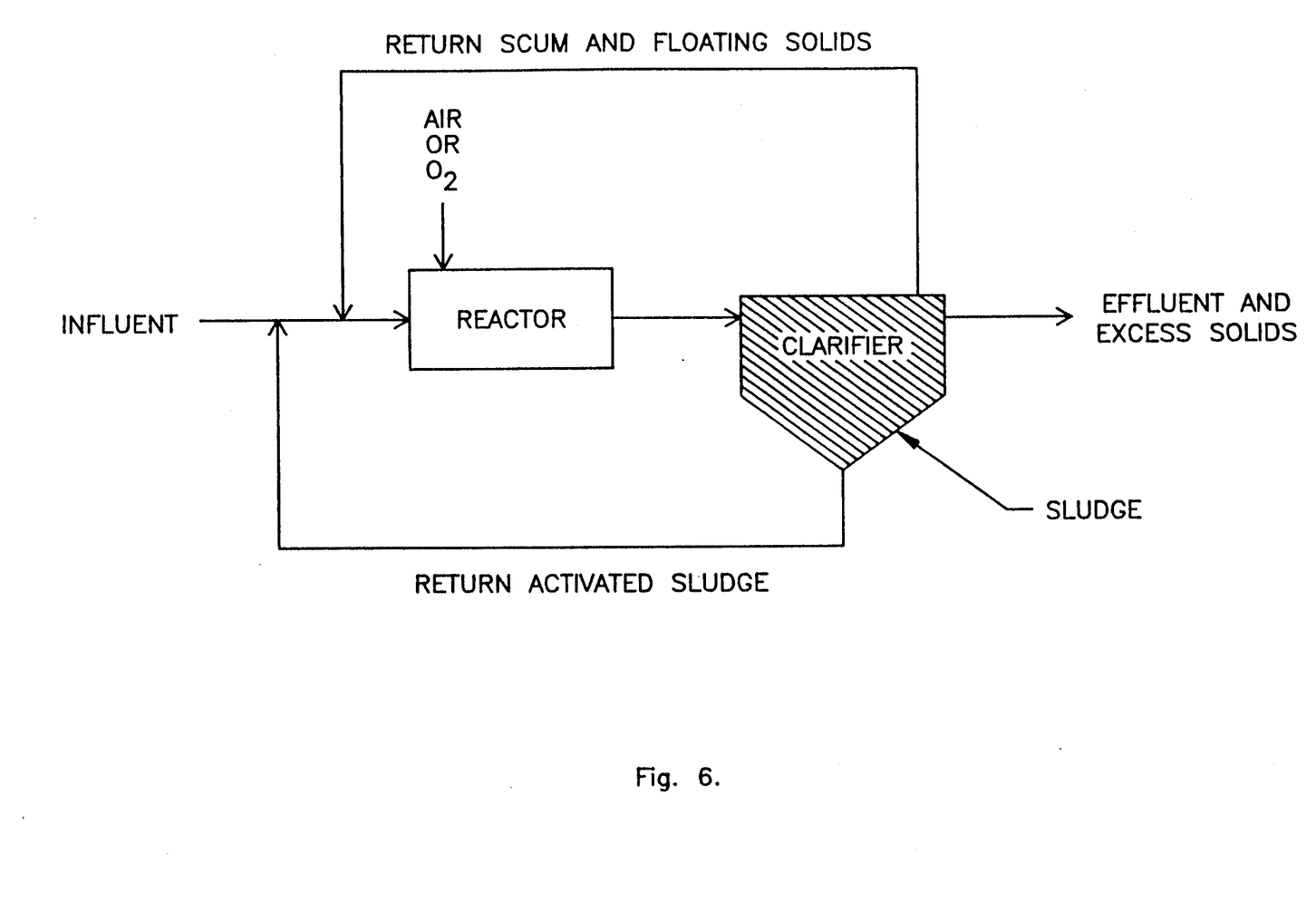
FIG. 6 shows an activated sludge process used as a bioreactor in an MSR.

Using the conventional system as a bioreactor in an MSR, as illustrated in FIG. 6, no wasting would be done from the return activated sludge recycle line, the sludge blanket height would be raised and all excess solids generated by the system would be allowed to pass out of the system into the clarifier effluent. All scum and floating material collected from the surface of the clarifier would be returned to be mixed with the incoming wastewater and transferred into the aeration chamber. Because of the increased solids content in the clarifier the return activated sludge flow rate would be increased to 50 to 200 percent, or more, of the influent flow rate and the suspended solids concentration in the aeration chamber would be allowed to increase as much as it could. Because this would also increase the solids content of the aeration chamber more air or oxygen would be added to insure that dissolved oxygen levels remained greater than 2 mg/l.

Similar types of modifications would be made to other biological wastewater treatment systems when they are used as bioreactors in an MSR. These modifications would all seek to eliminate any wasting from the system except through the clarifier effluent and would tend to concentrate the biomass of the system as much as possible with the introduction of new subenvironments within the existing wastewater treatment system.

THE MSR AS AN ACTIVE LANDFILL ALTERNATIVE

An MSR can be constructed so that it can continuously or periodically receive material which would normally be disposed of in a municipal landfill including garbage, trash, household wastes, debris, paper or the like, hereafter referred to as wastes.

This application comprises modifying the georeactor so that it incorporates the wastes both as a substrate and as a structural component. The georeactor itself is constructed in modular units or cells. Each cell is lined, contains an underdrain system for the collection of leachate, and contains several feet of porus gravel like material over the underdrain system. The wastes are introduced on top of this gravel like layer and covered with a thin layer of dirt after each introduction of wastes (often a days filling). When the cell is full it is also covered with a layer of porus gravel.

Once a cell is full and closed a solids ecoreactor is constructed on top of it and both the solids ecoreactor and the georeactor cells are incorporated into the operation of the MSR. As the bioconversion process occurs within the georeactor the waste zones in the georeactor cells shrink in size and the elevation of the top of the georeactor cell subsides. This will be compensated for by the buildup of the humus material in the solids ecoreactor on top of the georeactor cell. If this humus material is ever removed for other use, then the top layer of gravel of the georeactor cell can also be removed and new waste material can be added to the georeactor cell.

Figure 7:
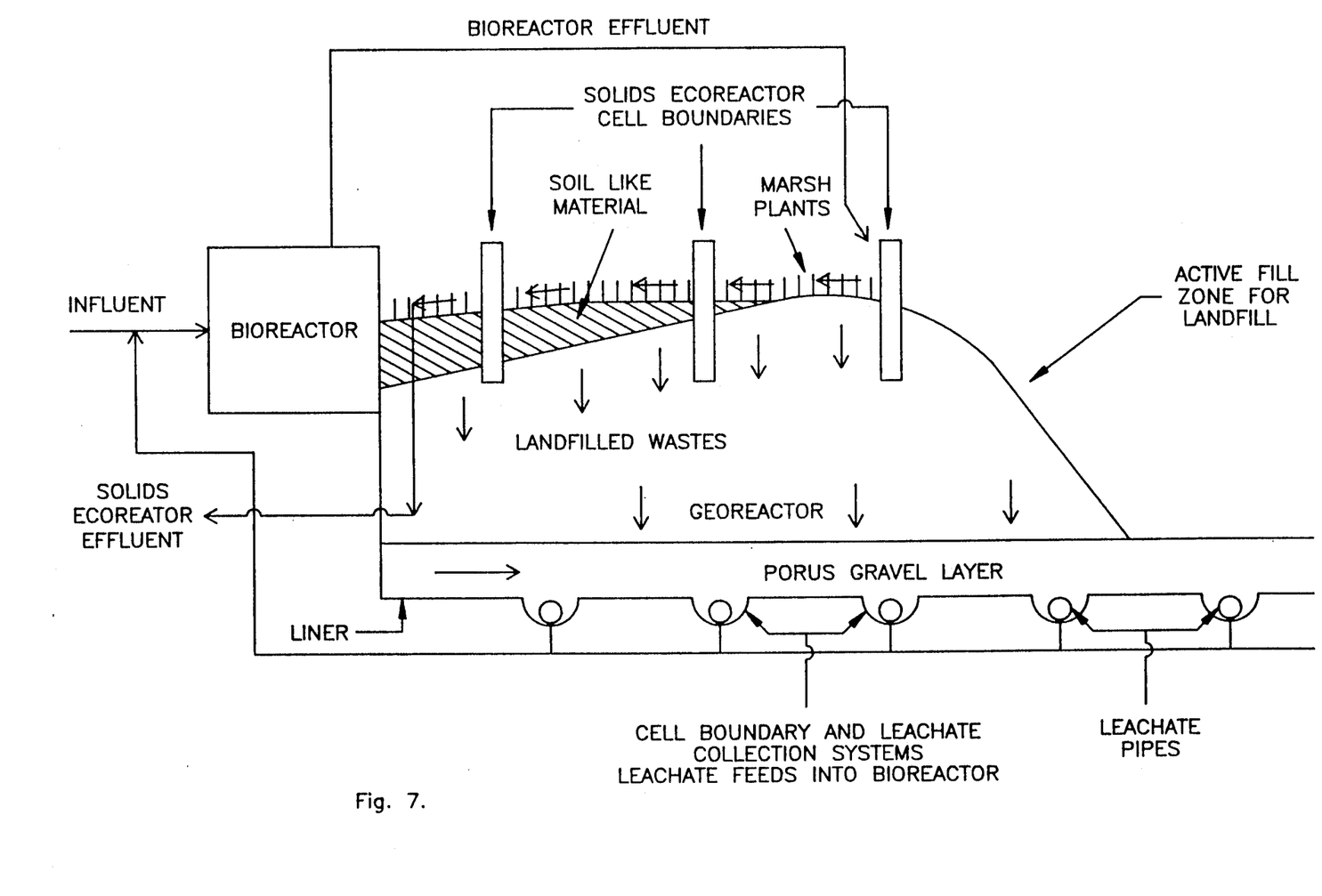
FIGS. 7-10 show embodiments of an MSR in conjunction with a landfill.

FIG. 7 illustrates one configuration of this application of the MSR. Therein the bioreactor is placed on one side of the landfill and is contained within a hillside or bermed area. The georeactor cells, and their accompanying solid ecoreactor cells, are constructed in a steadily expanding series of cells progressively moving away from the bioreactor. As this total bioconversion system grows it will result in a steadily growing wetland area on what would have been, in previous times, a dump site.

In general it is advantageous to incorporate this type of waste bioconversion application of the MSR with the wastewater treatment application as previously described. This combination results in the waste bioconversion system being adjacent to, and connected to, the wastewater, and wastewater sludge, treatment systems. By regulating the flow of water between the several systems it is easier to maintain proper control of all components of the total MSR.

THE MSR AS A BIOREMEDIATION SYSTEM FOR LANDFILLS

An MSR may be retrofitted to transform an existing landfill into an active bioconversion system. This involves installing bioreactor and solids ecoreactor subsystems and establishing appropriate hydraulic containment and control over the landfill itself, so that it can become a georeactor.

Figure 8:
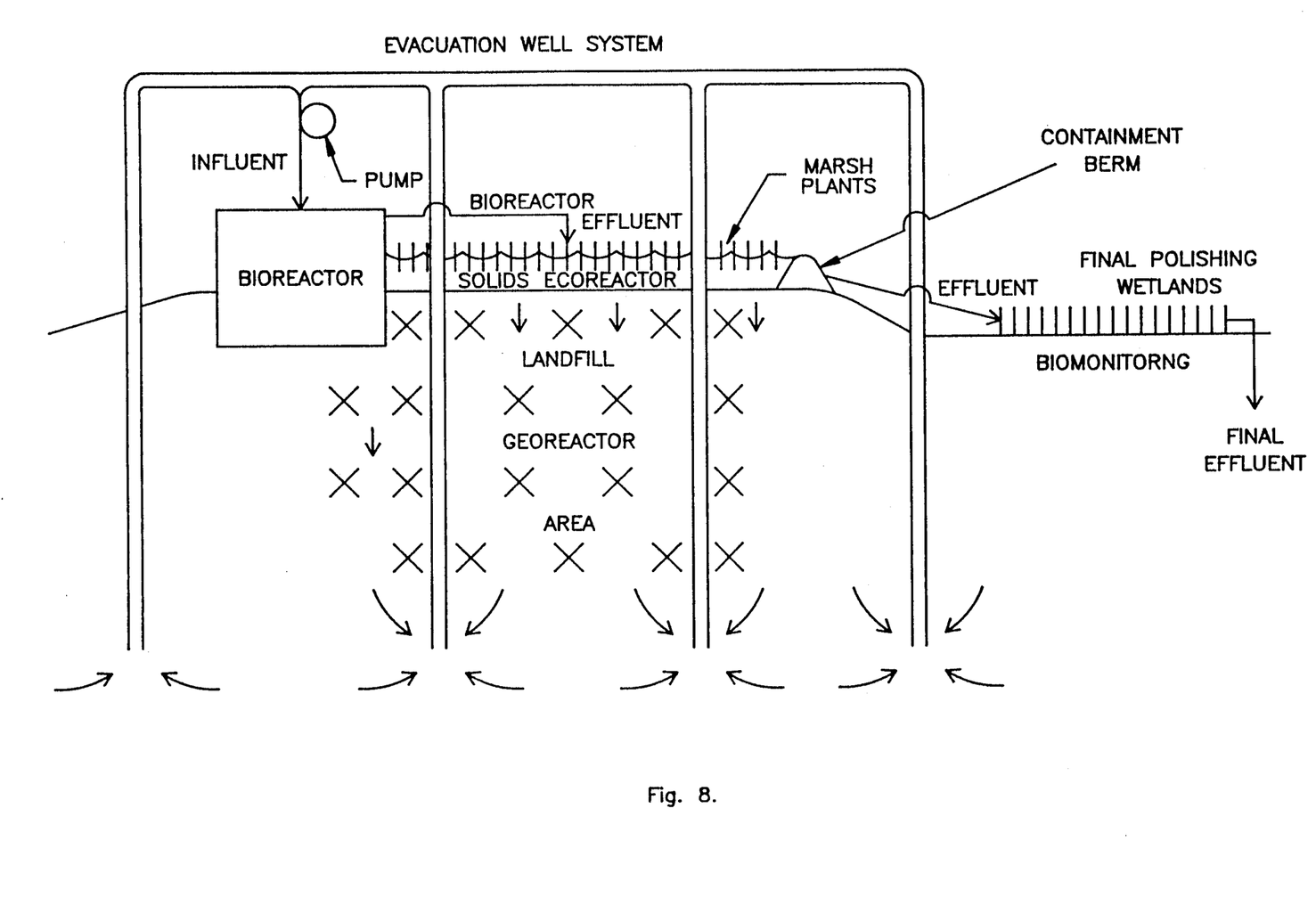
Figure 9:
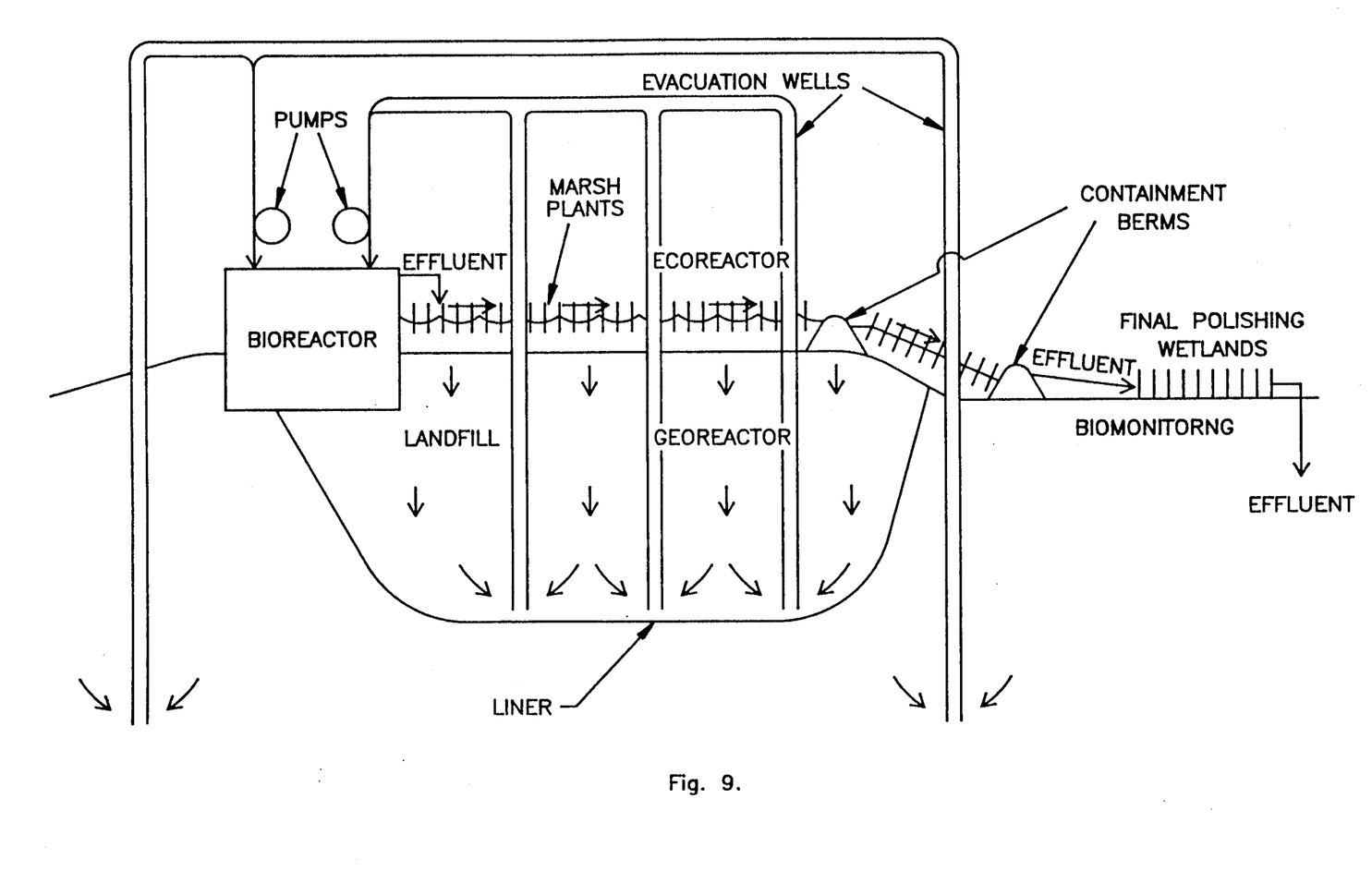

FIGS. 8 and 9 illustrate two ways in which this can be accomplished. FIG. 8 illustrates how an inactive landfill, which does not have any liner or leachate collection system, can be incorporated into a MSR for the bioconversion of the contained waste materials. Evacuation wells are established through and around the existing landfill area, with water from these wells being pumped into the bioreactor in a selective and controlled manner. This establishes a containment of the wastes with respect to the surrounding groundwater.

A solids ecoreactor is installed on top of the landfill which allows water from the solids ecoreactor to gradually flow into the landfill area (georeactor). Shallow injection wells or porus zones may be created within the landfill to ensure that an appropriate hydraulic connection can be made with all of the contained wastes.

FIG. 9 illustrates an inactive landfill having a liner and a leachate collection system which has been converted into an MSR for the bioconversion of the contained waste materials. In this installation, evacuation wells are installed around the periphery of the landfill to ensure that any waste material which may be leaking through the existing liner is captured. Groundwater and leachate are pumped from the wells and the existing leachate collection system into the bioreactor. If the existing leachate collection is incomplete or inadequate, several new wells may be installed within the area bounded by the existing liner to insure the appropriate hydraulic connection with all of the contained wastes.

THE MSR UTILIZED FOR HAZARDOUS WASTE SITES

The landfill applications described above can also be extended to include many sites which contain hazardous and toxic wastes.

A major problem with toxic wastes is to environmentally contain them for sufficient time to allow bioconversion. This is particularly true for volatile substances. Typically, the air or oxygen which is used to maintain dissolved oxygen levels in the bioreactor and solids ecoreactor is discharged into the atmosphere after passing through the relevant liquid. If there are volatile substances present in these aerated liquids, then a certain fraction of the volatile substances will be stripped out of the containing liquids and passed into the atmosphere with the exhausted gases.

Figure 10:
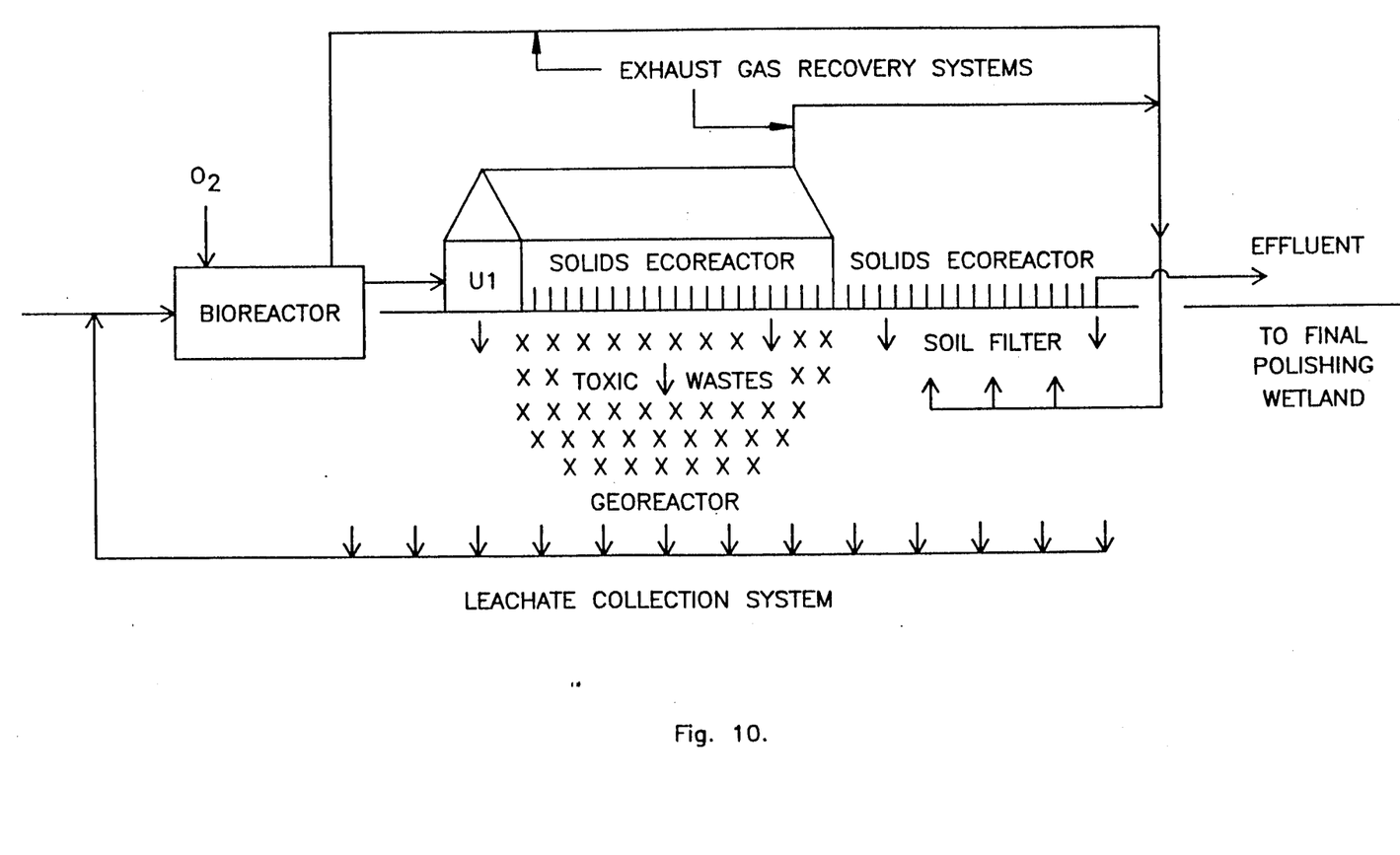

FIG. 10 illustrates modifications to the landfill MSR application previously described which prevents loss of toxic material to the atmosphere. In this application, oxygen is used instead of air in the bioreactor with the oxygen being introduced to the system by subsurface injection or by exposure in a confined vapor space. Such introduction greatly reduces the volume of gas required to maintain the desired dissolved oxygen levels within the bioreactor and also greatly reduces the volume of waste gas produced.

Waste gases are collected and passed through a soil filter which is a part of the solids ecoreactor and the georeactor. The soil filter comprises a layer of gravel or other inert porus material covered by several feet of porus soil which contains a high density of active microorganisms. The soil filter is normally damp, but not saturated with water and typically is periodically flushed with water flowing from the top to the bottom. The soil filter is located within the georeactor/solids ecoreactor systems such that it is accessible for monitoring and control.

The volatile toxic materials are typically scrubbed out of the gases which pass through the soil filter and bioconverted by microbial flora which live and are maintained within the soil filter. Alternately, the materials are elutriated out and passed back into the georeactor system by periodic flushing.

A greenhouse like containment structure can be installed over the solids ecoreactor so that all excess waste gases produced could be collected for treatment by the soil filter. The need to implement these procedures depends upon the type and quantity of toxic material present in the system.

Another major concern when dealing with toxic materials in an MSR involves the presentation of the toxic material to the bioconverting biomass. Bioconversion of toxic materials is usually highly dependent on concentration, thus it is necessary to control the movement and concentration gradients of toxic materials within the georeactor to control the amount of toxic materials which reach the bioreactor and the solids ecoreactor. Since a significant portion of the bioconversion of toxic materials occurs within the georeactor, and in old landfills and hazardous waste sites these materials are usually concentrated in specific locations within the site, the georeactor is generally constructed in such manner so as to allow for the controlled migration of the toxic materials into the active part of the georeactor. This is accomplished primarily by control of the hydraulic movement of water around the concentrations of toxic materials.

I claim:

1. A process for the bioconversion of non-desirable materials comprising introducing a non-desirable material into at least one primary zone of a reactor comprising a bioreactor primary zone containing at least one microbial environment and having a microbial biomass, a solids ecoreactor primary zone containing a wetlands environment containing living organisms comprising microorganisms, animals and plants, adequate to capture solids from the bioreactor primary zone, a georeactor primary zone comprising a porus mixture of inert material with a complex flora and fauna of living organisms, all of said primary zones being cyclically and dynamically interconnected to each other by a communicating circulating fluid; identifying at least one bioconverting subsystem, formed within a subzone of a primary zone to which the non-desirable material has been introduced, that actively bioconverts at least a portion of said non-desirable material; cyclically transporting at least a portion of said identified bioconverting subsystem, by an aqueous stream to a further primary zone of the reactor; collecting biologically produced solids from at least one bioconverting subsystem in a solids ecoreactor primary zone; recovering at least a portion of said biologically produced solids as a beneficial humus material; and, recovering water from the solids ecoreactor primary zone of the reactor.

2. The process of claim 1 wherein the environment of the primary zone in which the non-desirable material has been introduced is periodically modified to diversify the activity of identified bioconverting subsystems.

3. The process of claim 2 wherein said modified environment generates different subenvironments within a subsystem.

4. The process of claim 3 comprising fluid recycles between multiple subsystems within the reactor to enhance and encourage organism movement among combinations of subsystems and subenvironments.

5. The process of claim 2 wherein the environment of the primary zone in which the non-desirable material has been introduced is periodically modified through the addition of nutrients and the adjustment of size, location and functionality of subenvironments within subsystems.

6. The process of claim 1 wherein aqueous recovery from the ecoreactor is introduced into an artificial wetlands system comprising plants, animals and microorganisms which are indigenous to a local geographic environment.

7. The process of claim 6 wherein said wetlands system comprises indicator organisms.

8. The process of claim 6 comprising at least one of artificially constructed tanks, pools, streams and marshes.

9. The process of claim 1 wherein said non-desirable material comprises industrial or domestic wastewater.

10. The process of claim 1 wherein said non-desirable material comprises wastewater treatment sludge.

11. The process of claim 1 wherein said non-desirable material comprises solid waste material.

12. The process of claim 1 wherein said non-desirable material comprises toxic waste.

* * * * *